United States Patent [19]
Buck

[11] 3,844,532
[45] Oct. 29, 1974

[54] VALVE SEAT

[76] Inventor: Henry M. Buck, 3411 Plumb, Houston, Tex. 77005

[22] Filed: June 12, 1972

[21] Appl. No.: 261,676

[52] U.S. Cl............................ 251/360, 29/423, 16/2
[51] Int. Cl............................................. F16k 31/50
[58] Field of Search ............ 251/360, 361, 315, 366,
251/365, 362, 363, 364; 339/126, 221;
138/96 T; 277/212 F; 16/2; 85/DIG. 2;
210/431; 137/550, 318, 223; 4/287; 285/55;
152/370; 29/451, 453, 235

[56] References Cited
UNITED STATES PATENTS

| 438,572 | 10/1890 | Coffield | 251/365 |
|---|---|---|---|
| 1,708,141 | 4/1929 | Kepler | 29/235 X |
| 2,024,101 | 12/1935 | Kahn | 85/DIG. 2 |
| 2,078,903 | 4/1937 | Domack | 251/365 |
| 2,198,238 | 4/1940 | Adams | 251/365 |
| 2,210,046 | 8/1940 | Schubring | 251/365 X |
| 2,249,510 | 7/1941 | Welker | 29/451 |
| 2,693,929 | 11/1954 | Hart | 251/360 X |
| 2,701,119 | 2/1955 | Smith | 251/360 X |
| 2,768,807 | 10/1956 | Cohen et al. | 251/360 X |
| 2,791,366 | 5/1957 | Geisler | 85/DIG. 2 |
| 2,826,222 | 3/1958 | Case | 138/96 T |
| 2,920,861 | 1/1960 | Hartmann | 251/360 X |
| 2,953,345 | 9/1960 | Slemmons et al. | 251/368 X |
| 2,991,819 | 7/1961 | Lee | 152/370 |
| 3,052,259 | 9/1962 | Van Der Velden | 251/368 X |
| 3,087,232 | 4/1963 | Dow | 251/328 X |
| 3,122,161 | 2/1964 | Pfeifer | 251/362 X |
| 3,349,792 | 10/1967 | Larkin | 137/318 |
| 3,422,849 | 1/1969 | Manoogian | 251/315 X |

FOREIGN PATENTS OR APPLICATIONS

| 643,208 | 9/1950 | Great Britain | 251/365 |

*Primary Examiner*—Henry T. Klinksiek

[57] ABSTRACT

A generally cylindrically shaped valve seat formed of elastic or resilient material. A flange is formed on one end of the valve seat for sealing engagement with a valve disc when installed in a valve body. The other end of the valve seat may be completely open, partly open, or initially completely closed. In the latter form the initially closed end is cut out and removed after installation of the valve seat in the valve body. A placement tool is used to place or insert the valve seat into the flow passageway bore of the valve body until the flange of the valve seat is seated onto the portion of the valve body surrounding the bore. The valve seat is formed slightly larger in outside diameter than the diameter of the bore. During installation the placement tool is inserted into the valve seat and then used to force the valve seat into the bore. As the valve seat is forced into the bore it lengthens to reduce its outside diameter a sufficient amount to permit the valve seat to be tightly fitted in the bore.

13 Claims, 18 Drawing Figures

PATENTED OCT 29 1974 3,844,532
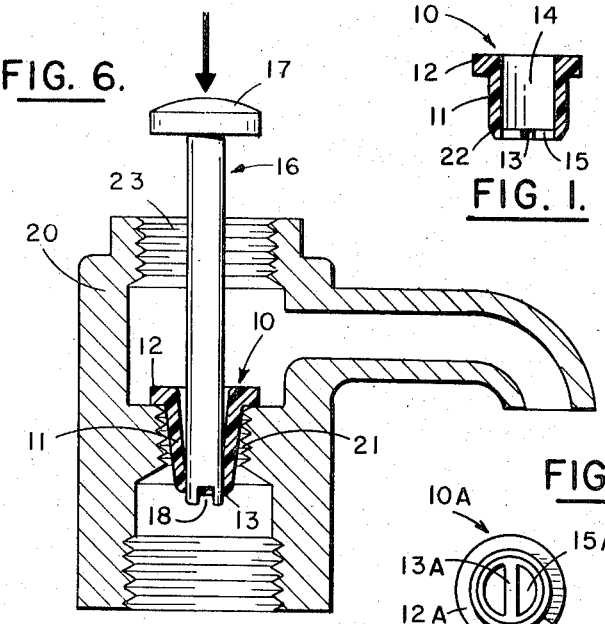
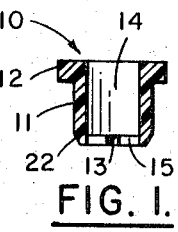
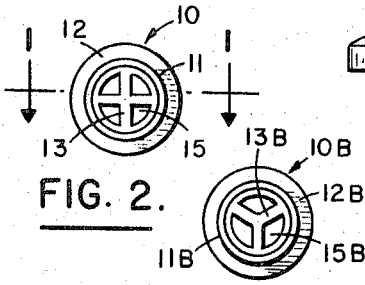
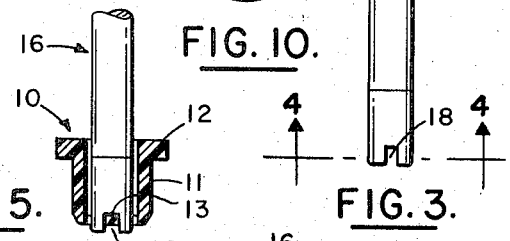
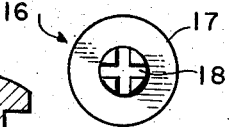
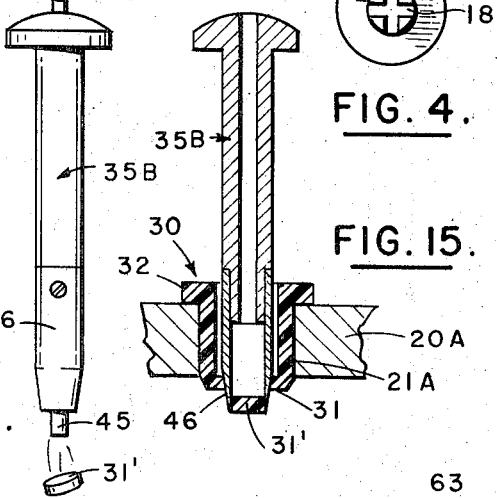
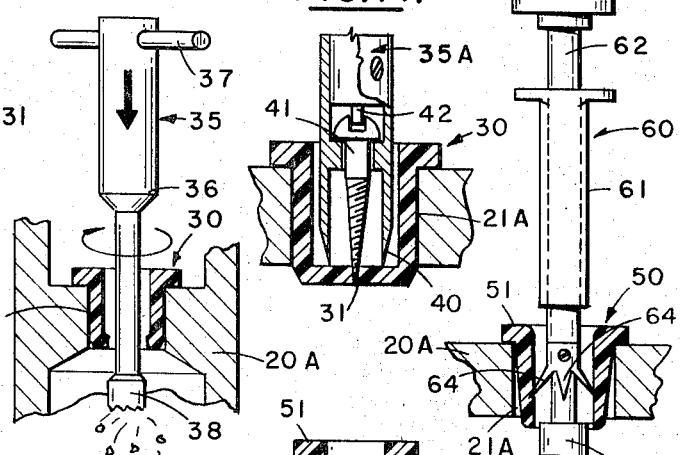
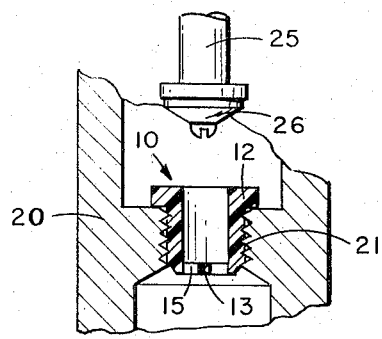
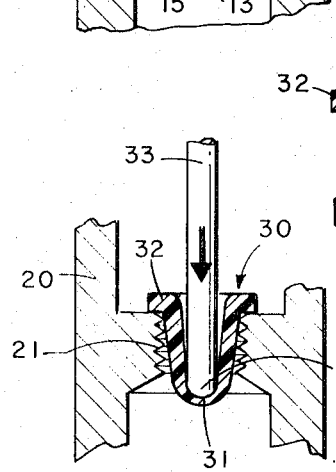
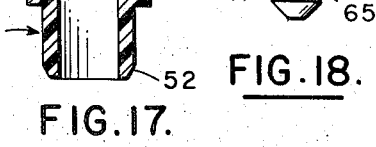
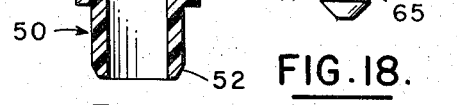

3,844,532

VALVE SEAT

FIELD OF THE INVENTION

The present invention concerns a novel valve seat and method of fitting it into a valve body. MOst valve seats are made of metal and are installed in a valve body by means of screw threads. Valve seats of this type are subject to electrolytic erosion which cause a channel to be eroded in the valve seat with resultant leaks in the valve.

SUMMARY OF THE INVENTION

This invention, briefly, concerns a valve seat capable of being forced into the flow passageway bore of a valve body. The valve seat is formed of elastic material and is generally cylindrical in shape. It is provided with an annular gasket at one end which seats on the valve body surrounding the passageway bore when the valve seat has been installed in the bore. The valve seat has an outside diameter slightly larger than the diameter of the bore.

BRIEF DESCRIPTION OF THE DRAWINGS

FIGS. 1 and 2 are sectional and bottom views respectively of one embodiment of the valve seat of the invention;

FIG. 3 is a side view of a placement tool for use in installing the valve seat of FIGS. 1 and 2;

FIG. 4 is a view taken along lines 4—4 of FIG. 3;

FIG. 5 is a side view showing the placement tool of FIGS. 3 and 4 positioned in the valve seat of FIGS. 1 and 2 preparatory to placement of the valve seat in a valve body;

FIG. 6 is a side view showing installation of the valve seat of FIGS. 1 and 2 in a conventional type faucet valve body;

FIG. 7 is a side view of the valve seat of FIGS. 1 and 2 installed in a valve body;

FIG. 8 is a bottom view of a modified valve seat;

FIG. 9 is an end view of a modified placement tool for use with the valve seat of FIG. 8;

FIG. 10 is a similar bottom view of another modification of a valve seat in accordance with the invention;

FIG. 11 is a side view of still another modification of a valve seat in accordance with the invention:

FIG. 12 is a side view in section illustrating installation of the valve seat shown in FIG. 11 in a valve body;

FIG. 13 is a side view of the valve seat of FIG. 11 installed in a valve body and a cutting tool used to cut out the initially closed end of the valve seat;

FIG. 14 is a side view illustrating a modified cutting tool for use with the valve seat of FIG. 11;

FIG. 15 is a side view illustrating operation of still another type of cutting tool for use with the valve seat of FIG. 11;

FIG. 16 is a side view illustrating operation of the cutting tool of FIG. 15;

FIG. 17 is a side view of another valve seat in accordance with the invention; and FIG. 18 is a side view illustrating installation of the valve seat of FIG. 17 using still another modified placement tool.

DESCRIPTION OF THE PREFERRED EMBODIMENTS

In FIG. 1 is shown a valve seat 10 comprising a generally cylindrically shaped body 11 having a flange 12 formed on one end. The other end, as seen more clearly in FIG. 2, is formed to provide crossed strips 13 extending through the center of the passageway 14 through the valve seat to form four quadrantal openings 15.

In FIGS. 3 and 4 is shown a placement tool 16 for use in placing valve seat 10 in a valve body. Placement tool 16 is provided with a handle 17 at one end and crossed grooves 18 at the other end. Grooves 18 engage strips 13 of valve seat 10 to facilitate the installation operation as shown in FIGS. 5 and 6. In FIG. 6 installation of the valve seat 10 in a conventional faucet-type valve body 20 is illustrated. Valve body 20 contains a flow passageway bore 21 which is shown threaded to receive a conventional metallic threaded valve seat but which may have a smooth wall instead. To install valve seat 10 the valve bonnet is removed from the threaded opening 23 and the valve stem and valve disc are removed and if necessary the metallic fitted valve seat is removed through opening 23. Placement tool or plunger 16 is then fitted into valve seat 10 as illustrated in FIG. 5 and forced into bore 21. Valve seat 10 is formed of deformable elastic material that is durable and corrosion resistant. Polyurethan is an example of the type material of which valve seat 10 is preferrably formed. The outside diameter of valve seat 10 is formed slightly larger than the diameter of bore 21. If bore 21 is threaded as shown then the outside diameter of valve seat 10 would be approximately the diameter of the threaded valve seat being replaced. Force is applied to the handle 17 after placing valve seat 10 at the upper end of bore 21 which elongates valve seat 10 and thereby reduces its diameter as it is forced into bore 21. The fit of the valve seat in bore 21 is made as tight as possible but it is not necessary that the valve seat form a seal with the bore. As an example of the size of the valve seat 10 for an average household valve it may have an outside body diameter of ½ inch with the flange 12 being ⅝ inch in diameter. The overall length may be ⅜ inch and the length of the flange may be 5/32 inch. In addition, the end of the valve seat may be tapered to facilitate entry into bore 21, as indicated at 22 on valve seat 10.

FIG. 7 shows valve seat 10 in its installed position 21 after placement tool 16 has been removed and the valve seat has returned to its initial length to make a tight fit in bore 21. In FIG. 7 a valve stem 25 to which is attached a valve disc (or washer) 26 are shown in their relationship to valve seat 10. When the valve is closed valve disc 26 seats on flange 12 of valve seat 10. Although valve disc 26 is shown conically shaped it may be formed flat.

The modified valve seat 10A shown in FIG. 8 is the same as valve seat 10 of FIGS. 1 and 2 except instead of using cross strips a single diametral strip 13A extends across the lower end (as shown) of the valve seat. The placement tool 16A shown in FIG. 9 is the same as placment tool 16 of FIGS. 3 and 4 except only a single groove 18A is used to engage strip 13A of valve seat 10A.

Valve seat 10B shown in FIG. 10 is the same as valve seats 10 and 10A except the lower end configuration of valve 10C has three strips of material 13B extending radially from a center to the sides of the lower end to form three openings 15B as shown. Although not shown a suitable placement tool having an end provided with grooves for engaging strips 13B would be used to place valve seat 10B in the bore of the valve body.

Of course, none of the embodiments of valve seats 10, 10A, and 10B needs a placement tool having grooves on the end. A placement tool having a smooth end could be used instead; however, the grooves aid in holding the valve seat on the placement tool as the valve seat is inserted into the valve body and bore of the valve body. Valve seat 30 shown in FIG. 11 is the same as the valve seats described above except the end 31 opposite to the flanged end 32 is closed off by material during its installation in the flow passageway bore. As seen in FIG. 12 valve seat 30 is being inserted or placed in bore 21 of a valve body 20 by means of a placement tool 33 which has a smooth lower end 34. As illustration in FIG. 13 the valve bore 21A of body 20A may be smooth instead of threaded. As further illustrated in FIG. 13 a cutter tool 35, illustrated as a tubular rod 36 provided with handles 37 at one end and cutter blades 38 at the other end is used to cut out the bottom 31 of valve seat 30. Tool 35 is inserted into the valve body and into valve seat 30. Once it engages end 31 the tool is rotated by handle 37 and blades 38 cut out the material closing end 31.

In FIG. 14 a different type cutter tool 35A for use with valve seat 30 of FIG. 11 is illustrated. Tool 35A is provided at its cutter end with cutter edge 40 and a screw member 41 connected to the tool for rotation therewith by a driver lug 42. When cutter tool 35A is rotated to cut out the material on the end 31 of valve seat 30 screw 41 screws into end 31 as it is being cut out by cutter blade 40. When end 31 has been cut out screw 41 is affixed to it and is removed with tool 35A as that tool is removed from valve body 20A.

Another modification of a cutter tool 35B is illustrated in FIGS. 15 and 16. Tool 35B includes a push rod 45 arranged within a cutter sleeve 46 containing a cutter blade on one end. Once cutter sleeve 46 has cut out a plug 31' of end 31 of valve seat 30 the cut out plug is retained within the cutter sleeve and removed with tool 35B. After removal of tool 35B from valve body 20A push rod 45 is used to remove the plug from cutter sleeve 46.

The modified valve seat 50 shown in FIGS. 17 and 18 differ from the other valve seats in that it is fully open at each end. It has a flange 51 formed on one end and may be tapered at the other end as at 52. Placement tool 60 includes an outer sleeve 61 surrounding a push rod 62 which has a handle 63 at one end and a set of spiked spring prongs 64 adjacent the other end thereof. A stop shoulder 65 may be positioned on push rod 62 below spring prongs 64. When installing valve seat 50 sleeve 61 is pushed down over prongs 64 so that the prongs are retracted within sleeve 61. Tool 60 is then positioned in valve seat 50. Sleeve 61 is then raised to permit prongs 64 to extend outwardly and engage the inner wall of valve seat 50. Tool 60 is then pushed down by applying force to the handle 63 to force valve seat 50 into place in bore 21A of valve body 20A.

Sleeve 61 is then lowered to prongs 64 and push rod 62 is raised in sleeve 61 until prongs 64 are retracted within sleeve 61. Tool 60 is then removed from valve seat 50. All of the valve seats illustrated may be installed in threaded bores such as 21 or smooth bores such as 21A. In the embodiment of the valve seats illustrated in FIGS. 1, 8, 10, and 11 the end opposite the flanged end may be formed of thinner material than the wall thickness of the valve seat.

Changes and modifications may be made in the illustrative embodiments of the invention shown and/or described herein without departing from the scope of the invention as defined in the appended claims.

Having fully described the apparatus, method of operation, advantages and objects of my invention I claim:

1. A valve seat for placement by means of a placement tool in the flow passageway bore of a valve housing comprising an elastic generally cylindrical member having a bore therein and capable of being elongated, reduced in outside diameter and forced into said bore of said valve housing by said placement tool and having an annular flange at one end thereof for seating on the valve housing surrounding said bore of said valve housing, said cylindrical member having an outside diameter slightly larger than the diameter of said bore of said valve housing before said cylindrical member is elongated and placed in said bore of said valve housing; and means extending into said bore of said cylindrical member for engagement by said placement tool, said cylindrical member tightly fitting the bore of said valve housing following placement therein.

2. A valve seat as recited in claim 1 in which the other end of said member is tapered to facilitate entry into said bore.

3. A valve seat as recited in claim 1 formed of polyurethane.

4. A valve seat as recited in claim 1 in which said one end of said member is fully open and said means extending into said bore of said cylindrical member closing the other end of said cylindrical member opposite the flanged end thereof prior to installation of said cylindrical member in the bore of said valve housing and openable after insertion of said cylindrical member in said bore of said valve housing.

5. A valve seat as recited in claim 1 in which said one end of said cylindrical member is fully open and said means extending into said bore of said cylindrical member comprises a strip at the other end of said cylindrical member opposite the flanged end extending diametrally across said other end to form two openings therethrough.

6. A valve seat as recited in claim 1 in which said one end of said cylindrical member is fully open and said means extending into the bore of said cylindrical member comprises crossed strips at the other end of said cylindrical member opposite the flanged end thereof to form four quadrantal openings in said other end.

7. A valve seat as recited in claim 1 in which said one end of said cylindrical member is open and said means extending into said bore of said cylindrical member comprises three strips extending from the center of said other end radially to the side of said cylindrical member to form three openings in said other end.

8. A valve seat for placement in the flow passageway bore of a valve housing comprising an elastic, generally cylindrical member having a bore therein and capable of being elongated and forced into said flow passageway bore and having an annular flange at one end thereof for seating on said valve housing surrounding said flow passageway bore and having means extending into the bore thereof to aid in placing said cylindircal member in said flow passageway bore, said cylindrical member normally having an outside diameter slightly larger than the diameter of said flow passageway bore when said cylindrical member is not elongated to permit the cylindrical member to be tightly fitted in said flow passageway bore following elongation and placement in said flow passageway bore, said cylindrical member having sufficient strength axially and radially to avoid collapse.

9. A valve seat as recited in claim 8 in which said means in the bore of said cylindrical member comprises material extending across the bore of said cylindrical member thinnr than the material of the wall of said cylindrical member.

10. A valve seat as recited in claim 8 in which said means in the bore of said cylindrical member comprises material extending across and completely closing the bore of said cylindrical member prior to installation of said cylindrical member in said flow passageway of said valve housing and removable toopen the bore of said cylindrical member after installation of said cylindrical member in said flow passageway of said valve housing.

11. A valve seat as recited in claim 8 in which said means in the bore of said cylindrical member comprises a strip of material extending diametrally across the bore of said cylindrical member.

12. A valve seat as recited in claim 8 in which said means in the bore of said cylindrical member comprises crossed strips of material extending across the bore of said cylindrical member forming four quadrantal openings in the bore of said cylindrical member.

13. A valve seat as recited in claim 8 in which said means in the bore of said cylindrical member comprises three strips of material extending from the center of the bore radially to the side of said cylindrical member forming three openings in the bore of said cylindrical member.

* * * * *